UNITED STATES PATENT OFFICE.

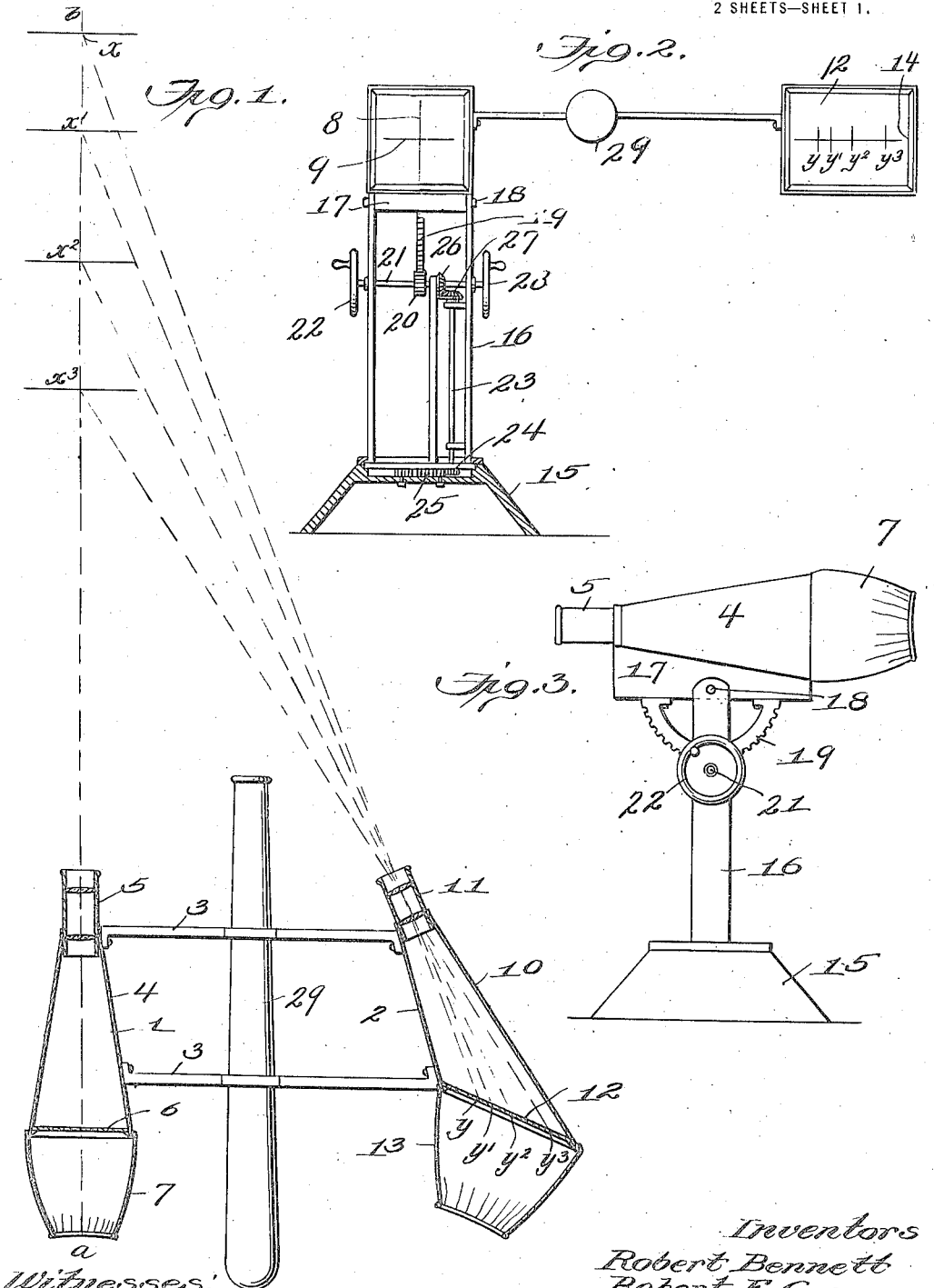

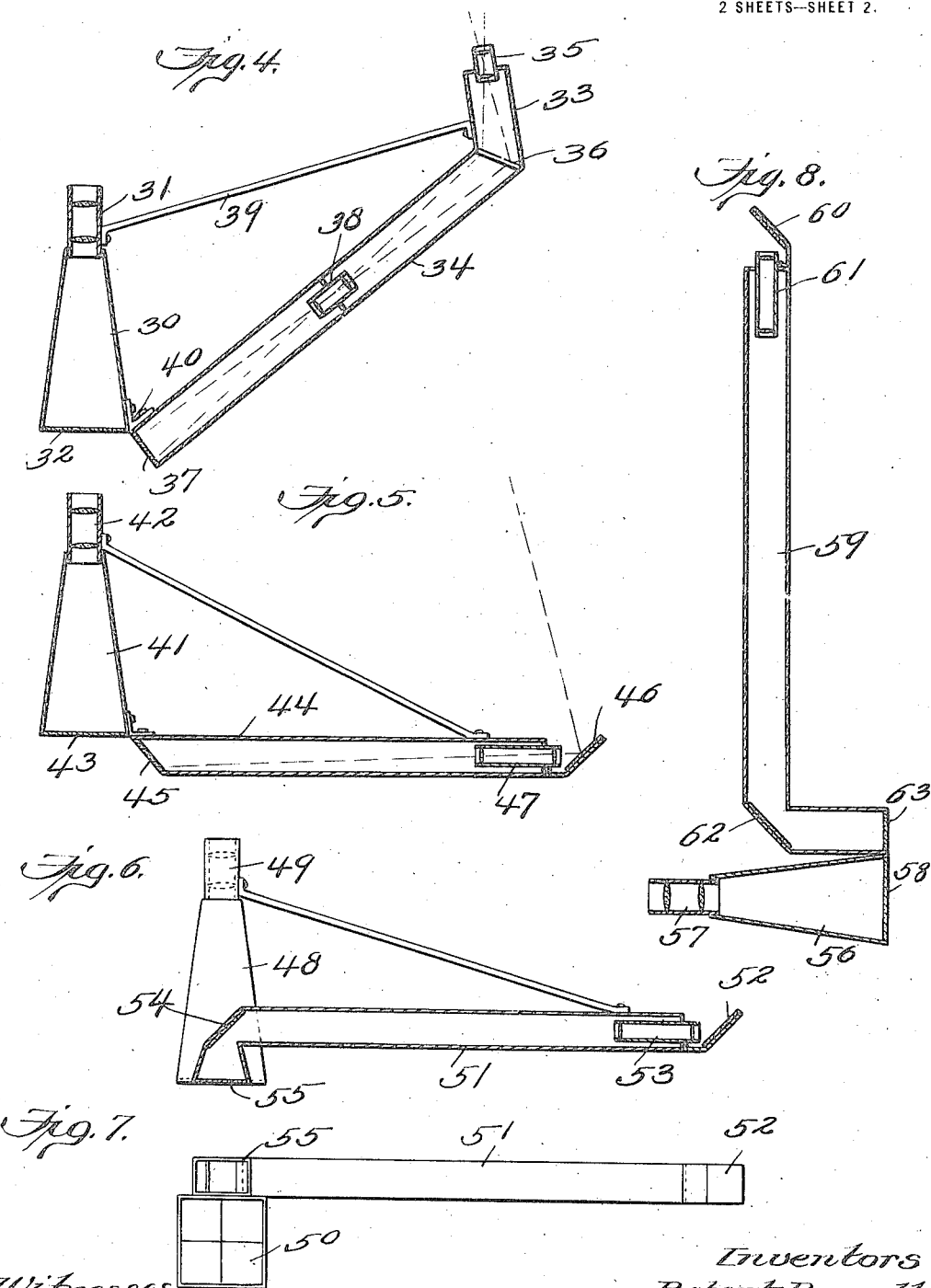

ROBERT BENNETT, OF NEW YORK, N. Y., AND ROBERT E. COX, OF ANNAPOLIS, MARYLAND.

RANGE-FINDER.

1,207,475.   Specification of Letters Patent.   Patented Dec. 5, 1916.

Application filed January 26, 1916. Serial No. 74,447.

*To all whom it may concern:*

Be it known that we, ROBERT BENNETT and ROBERT E. Cox, citizens of the United States, residing at (1) New York, (2) Annapolis, in the counties of (1) New York, (2) Anne Arundel, and States of (1) New York, (2) Maryland, have invented new and useful Improvements in Range-Finders, of which the following is a specification.

The present invention relates to improvements in optical instruments for use in connection with ordnance and for other purposes, and the primary object of the invention is to provide an improved range finder which avoids the complicated and delicate mechanism heretofore found necessary and which enables ranges of distant objects to be determined quickly, accurately and directly, the necessity of making computations from data obtained from scales or calibrations being obviated. Furthermore, by associating the instrument with a gun or other piece of ordnance, the same may also serve the purposes of a gun-sighting instrument.

To these and other ends, the invention consists in certain improvements, and combinations and arrangements of parts, all as will be hereinafter more fully described, the novel features being pointed out particularly in the claims at the end of the specification.

In the accompanying drawings: Figure 1 is a diagrammatic view showing one embodiment of the invention. Fig. 2 is a rear elevation, and Fig. 3 is a side elevation showing the instrument mounted on an appropriate stand. Figs. 4–8 inclusive are diagrammatic views showing other embodiments of the invention.

Similar parts are designated by the same reference characters in the several views.

The present invention is adapted primarily for use as a range finder and is particularly useful in connection with ordnance for the purpose of determining quickly and with sufficient accuracy the ranges of distant objects.

The primary purposes of the invention are to enable the ranges of distant objects to be determined quickly and directly and under conditions which enable the observer or observers to continuously view the object without difficulty or discomfort, although the object may be moving and the instrument subjected to the shock due to discharge of guns in proximity thereto.

Furthermore, it is an object of the present invention to provide an instrument which requires no focusing for the eye of the observer and which enables the observer to view an image of the object with both eyes and in a natural way.

Several embodiments of the invention are shown in the accompanying drawings and will be hereinafter described in detail. It is to be understood, however, that such embodiments of the invention are shown as examples and that other embodiments are contemplated and will be included within the scope of the claims at the end of the specification.

In the embodiment of the invention shown in Figs. 1–3 inclusive, the instrument comprises members 1 and 2 which are connected in fixed relation by suitable means such as braces 3. The member 1 comprises a suitable casing 4 having a lens system 5 fitted in its forward end and a screen 6 fitted in its rear end, the screen 6 being composed of a ground glass or other medium capable of receiving the image of an object projected on the screen by the lens system 5. A hood 7 may be attached to the rear end of the casing 4 to receive the head or face of the observer, this hood excluding light from the rear of the screen 6 to a degree sufficient to render the image clearly visible on the screen. The screen 6 is provided with an appropriate index mark to enable the member 1 of the instrument to be trained accurately on the object. In the present instance, the point of intersection of vertical and horizontal lines 8 and 9, respectively, on the screen provides a suitable index mark. The member 2 of the instrument also comprises a suitable casing 10 having a lens system 11 fitted in the forward end thereof and a suitable screen 12 fitted in the rear end thereof, a hood 13 being attached to the rear end of the casing, if desired, to serve similar purposes as the hood 7, that is, to render clearly visible the image on the screen 12. The members 1 and 2 of the instrument are spaced laterally for a suitable distance, and the optical axes of the members of the instrument are in angular relation. For example, *a—b* indicates the optical axis of the member 1 of the instrument, this line passing through the optical axis of the lens system 5 and the point of intersection of the lines 8 and 9 on the screen 6, and the optical axis of the lens system 11 is in convergent relation to the optical axis $a$—$b$ of the member 1. With the members of the instrument arranged in this manner and the optical axis $a$—$b$ of the member 1 of the instrument directed on an object at a distance indicated at $x$, an image of the object at $x$ will be projected by the lens system 11 onto the screen 12 at the point $y$. Likewise, with the optical axis $a$—$b$ directed at objects located at the distances indicated at $x'$, $x^2$ and $x^3$, images of these objects will be projected by the lens system 11 onto the screen 12 at the points $y'$, $y^2$ and $y^3$, respectively. The screen 12 is provided preferably with a horizontal line 14 which corresponds with the horizontal line 9 on the screen 6, and when the instrument is leveled properly, the images on the screens 6 and 12 will appear on these horizontal lines 9 and 14, respectively. The line 14 on the screen 12 is calibrated or graduated appropriately in ranges and hence the point where the image appears along the line 14 will, by reference to the calibrations along this line, indicate directly the range of the object, provided the image of the same object at the same moment appears at the intersection of the lines 8 and 9 on the screen 6.

In the embodiment of the invention shown in Figs. 1-3 inclusive, two operators or observers will manipulate the instrument, one operator adjusting the instrument to maintain the image of the object precisely on the intersection of the lines 8 and 9 on the screen 6, while the other operator observes the range of the object as indicated by the position of the image thereof along the line 14 on the screen 12. Obviously, both operators may view the images on the respective screens with both eyes and with normal eyesight, and there is no necessity for the operators to maintain any fixed or close relation between their eyes and the instrument, as is necessary with range finders employing telescopes.

Any suitable base or stand may be provided for the instrument. Preferably, the instrument is so mounted that it may be adjusted in altitude and in azimuth. A base or stand capable of providing these adjustments is shown in Figs. 2 and 3, 15 designating a suitable support which may be fixed, a rotatable standard 16 is mounted on the support, and a table 17 fixed to the casing 4 of the instrument 1 is pivotally mounted on the standard 16 on the horizontal axis 18. Rotation of the standard 16 on a vertical axis provides movement of the range finder in azimuth, and rotation of the instrument on the horizontal axis 18 provides for adjustment of the instrument in altitude. In the present instance, a gear segment 19 is fixed to the table 17 and coöperates with a pinion 20, the latter being fixed to a shaft 21 provided with a hand-wheel 22. The standard 16 carries a vertical shaft 23 the lower end of which is provided with a pinion 24 which coöperates with a gear 25 secured to the support 15, while the upper end of the shaft 23 is connected by the gears 26 to a shaft 27, the latter having a hand-wheel 28 for rotating it. With such a construction, the hand-wheels 22 and 28 provide convenient means for adjusting the range finder in altitude and in azimuth, respectively, these hand-wheels being in convenient reach of the hands of the operator or observer stationed in a position to view the screen 6 of the member 1 of the instrument. If desired, the same instrument may also perform the function of a gun-sighting instrument. This is accomplished by so mounting the instrument relatively to the gun that the optical axis $a$—$b$ of the member 1 of the instrument is in parallelism with the bore of the gun. In Fig. 1, the barrel 29 of a gun is shown with the range finder fixed thereto, and in this instance, the gun mounting may serve as the adjustable stand or mount for the instrument.

Figs. 4-8 inclusive show other embodiments of the invention operating upon the principle hereinbefore described. In Fig. 4, the instrument is shown as comprising a member 30 having a lens system 31 in the forward end thereof and an image-receiving screen 32 in the rear thereof, and a bent tube composed of the sections 33 and 34, a lens system 35 being fitted in the forward end of the section 33, an image-receiving screen 36 being fitted in the angle formed at the joint between the tube sections 33 and 34, an image-receiving screen 37 is fitted in the rear end of the tube section 34, and a lens system 38 is provided to project the image appearing on the screen 36 onto the screen 37. The tube sections 33 and 34 are connected in fixed relation to the section 30 of the instrument by the brackets 39 and 40. The screens 32 and 37 correspond to the previously described screens 6 and 12, they may be graduated to correspond with the graduations of the screens 6 and 12 respectively, and in this embodiment of the invention both screens may be observed by one operator owing to their adjacent relation.

In the construction shown in Fig. 5, the instrument comprises a member 41 having a lens system 42 in the forward end thereof and an image-receiving screen 43 in the rear thereof and a tube 44 having an image-receiving screen 45 adjacent to the screen 43, a mirror 46, and a lens system 47 to project an image from the mirror 46 onto the screen 45. In this instance, the screens 43 and 45 correspond to the previously described screens 6 and 12 respectively, and they may be similarly graduated. In this embodiment of the invention, only one observer is required.

In the construction shown in Figs. 6 and 7, the instrument comprises a member 48 having a lens system 49 in its forward end and a screen 50 at the rear, and a tube 51 having a mirror 52 to receive an image of the distant object, a lens system 53 to project the image from the mirror 52 onto a second mirror 54, and a screen 55 located above the screen 50 to receive the image from the mirror 54. In this instance, the screens 50 and 55 correspond to the previously described screens 6 and 12 and they may be similarly graduated. In this embodiment of the invention, the screens are also in such proximity that the services of but one operator are required.

Fig. 8 shows an embodiment of the invention which is adapted for use in connection with a mast or other vertical structure. The instrument in this instance comprises a member 56 the axis of which is horizontal, it having a lens system 57 in the forward end thereof and an image-receiving screen 58 in the rear thereof, and a vertical tube 59 is provided having a mirror 60 arranged at its upper end at a suitable angle to receive an image of the object, a lens system 61 being placed below the mirror to project the image therefrom onto a second lower mirror 62, and a screen 63 is provided at the rear end of the tube 59 and above the screen 58 to receive the image of the object. In this instance, the screens 58 and 63 correspond to the screens 6 and 12 and they may be similarly marked or graduated.

The present invention enables range finders to be produced which are relatively simple and inexpensive in construction and are capable of being used with facility to quickly and accurately determine the ranges of distant objects. Inasmuch as the relatively large field of view afforded by the image screens enables the image of the object to be constantly observed by the operator even though the object may be moving rapidly or may be at a relatively short range, the manipulation of the range finder to determine the ranges of aeroplanes and the like is easy and affords obvious advantages as compared with range finders of the usual type employing telescopes with eyepieces for the eyes of the observer.

We claim as our invention:—

1. A range finder comprising a pair of optical elements, means to receive and to render visible thereon images of a distant object from the respective optical elements, an index mark coöperative with one of said means and with which one of the images is to be maintained in coincidence, and a graduated scale coöperative with the other of said means and with the other image to indicate directly the range of the object.

2. A range finder comprising a pair of surfaces capable of receiving and rendering visible images thereon, and means for projecting images of a distant object, taken simultaneously from different view points, onto the respective image-receiving surfaces.

3. A range finder comprising a pair of surfaces capable of receiving and rendering visible images thereon, one of said surfaces having a range-indicating scale coöperative therewith, and means embodying lenses for projecting images of a distant object, taken from relatively laterally displaced points, onto the respective image-receiving surfaces.

4. A range finder comprising a pair of screens capable of receiving and rendering visible images thereon, one screen having an index mark and the other screen having a range-indicating scale, means for projecting an image of a distant object onto the first-mentioned screen in register with said index mark therefor, and means for projecting an image of the distant object, as viewed from a relatively laterally displaced point, onto the second-mentioned screen to coöperate with the range-indicating scale.

5. A range finder comprising a pair of optical elements having their axes relatively displaced laterally, screens capable of receiving and rendering visible thereon images of a distant object from the respective optical elements, said screens having reference lines in alinement thereon, an index mark on one of the screens, and a range-indicating scale on the other screen, said screens being adapted to receive images of a distant object as viewed from relatively laterally displaced points, the image visible on one screen coöperating with the index mark thereon while the image visible on the other screen coöperates with the range-indicating scale thereon.

In testimony whereof we have hereunto set our hands in the presence of two subscribing witnesses.

ROBERT BENNETT.
ROBERT E. COX.

Witnesses to the signature of Robert Bennett:
STANLEY MARQUES,
HELEN D. BENNETT.

Witnesses to the signature of Robert E. Cox:
J. LAWRENCE WALTON,
JOHN M. GREEN.